United States Patent
Blakeslee et al.

(10) Patent No.: US 7,464,527 B2
(45) Date of Patent: Dec. 16, 2008

(54) ADJUSTABLE HOLD-DOWN FOR SICKLE GUARDS

(75) Inventors: Edward A. Blakeslee, Ephrata, PA (US); Emmett F. Glass, Akron, PA (US)

(73) Assignee: CNH America LLC, New Holland, PA (US)

( * ) Notice: Subject to any disclaimer, the term of this patent is extended or adjusted under 35 U.S.C. 154(b) by 683 days.

(21) Appl. No.: 10/319,292

(22) Filed: Dec. 14, 2002

(65) Prior Publication Data

US 2004/0112030 A1  Jun. 17, 2004

(51) Int. Cl.
*A01D 34/18* (2006.01)
(52) U.S. Cl. .......................................... 56/298; 56/307
(58) Field of Classification Search .................. 56/307, 56/296, 298, 305, 308, 310
See application file for complete search history.

(56) References Cited

U.S. PATENT DOCUMENTS

| | | | | | |
|---|---|---|---|---|---|
| 621,562 | A | * | 3/1899 | Giffhorn | 56/305 |
| 690,340 | A | * | 12/1901 | Wuegner | 56/309 |
| 847,568 | A | * | 3/1907 | Gerbing | 56/305 |
| 870,358 | A | * | 11/1907 | Griffiths | 56/305 |
| 1,064,074 | A | * | 6/1913 | Howk | 56/305 |
| 1,917,604 | A | * | 7/1933 | Scranton, Jr. | 56/298 |
| 2,203,982 | A | | 6/1940 | Coultas et al. | 56/305 |
| 2,528,659 | A | * | 11/1950 | Krause | 56/298 |
| 2,619,787 | A | * | 12/1952 | Mills et al. | 56/310 |
| 3,098,338 | A | * | 7/1963 | Myers | 56/296 |
| 3,314,222 | A | * | 4/1967 | Scarnato et al. | 56/305 |
| 3,490,215 | A | | 1/1970 | Chapman et al. | 56/298 |
| 3,978,645 | A | | 9/1976 | Bennett et al. | 56/310 |
| 4,012,891 | A | | 3/1977 | Steuerwald | 56/305 |
| 4,198,803 | A | * | 4/1980 | Quick et al. | 56/296 |
| 4,387,554 | A | * | 6/1983 | Bedogni | 56/296 |
| 4,519,192 | A | | 5/1985 | Oppenhuisen et al. | 56/298 |
| 4,894,979 | A | | 1/1990 | Lohrentz | 56/305 |
| 5,343,682 | A | * | 9/1994 | Puncochar | 56/305 |
| 5,694,754 | A | * | 12/1997 | Shuknecht et al. | 56/298 |
| 6,305,154 | B1 | | 10/2001 | Yang et al. | 56/298 |

\* cited by examiner

*Primary Examiner*—Thomas B Will
*Assistant Examiner*—Alicia Torres
(74) *Attorney, Agent, or Firm*—Patrick M. Sheldrake; John William Stader; Michael G. Harms

(57) ABSTRACT

A forged sickle bar hold-down formed with a reduced transverse cross-sectional area and a first hole therethrough positioned toward the rear end of the hold-down is disclosed. The hold-down includes a second hole therethrough positioned between the reduced cross-sectional area and the first hole. In use, an attachment bolt is positioned through the first hole and a support bar and rigidly affixed thereto. A threaded adjustment bolt is inserted through the second hole and the support bar to selectively draw down on that portion of the hold-down forward of the reduced transverse cross-sectional area and thereby flex the forward portion of the hold-down which includes an elongated finger-like body portion with a knife section facing area.

4 Claims, 5 Drawing Sheets

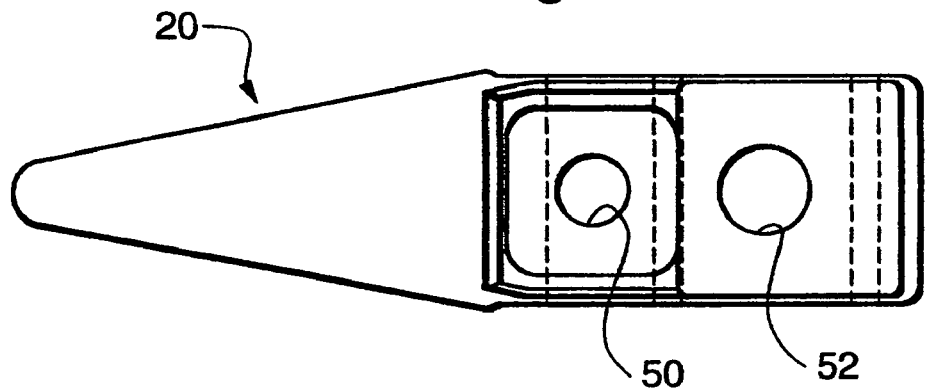
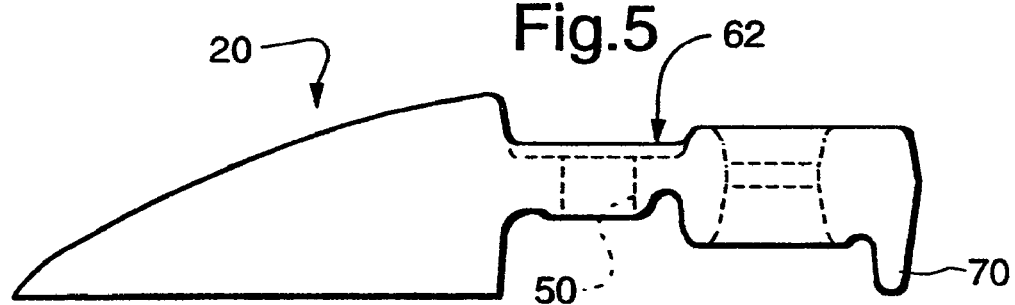
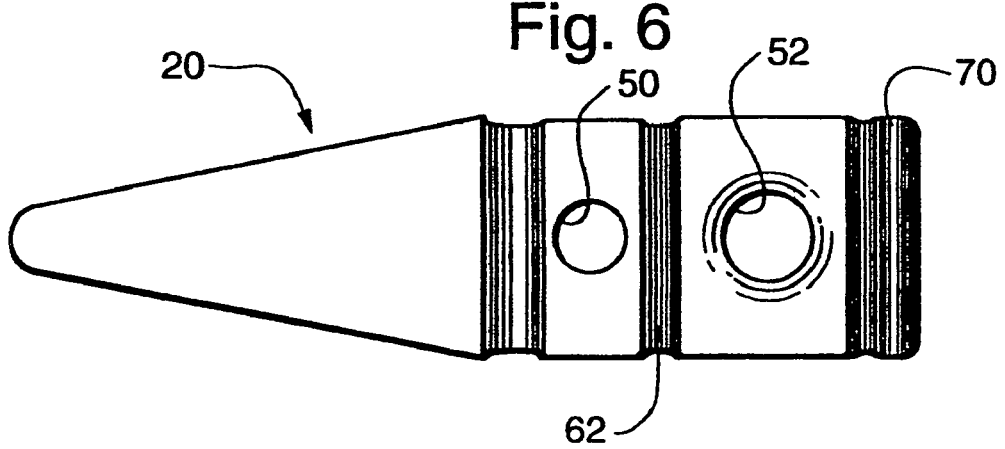

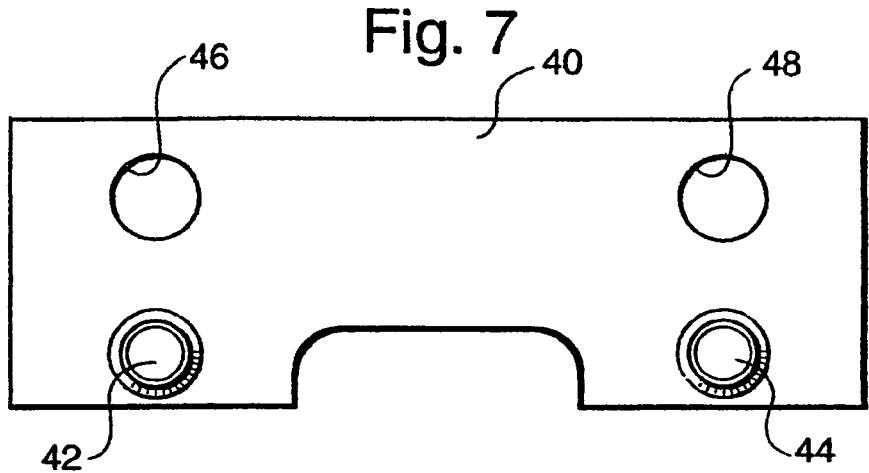
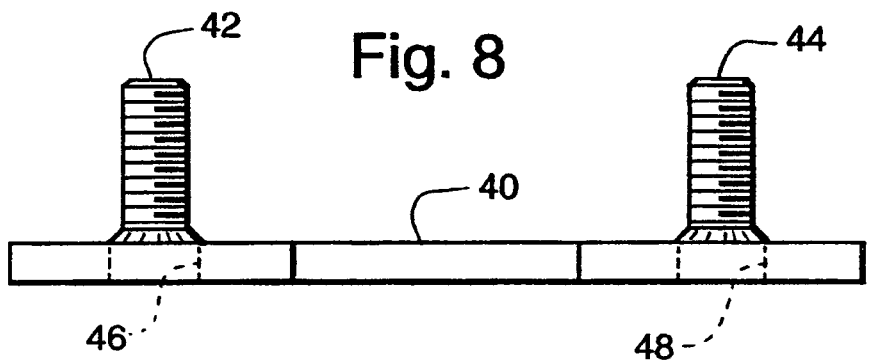
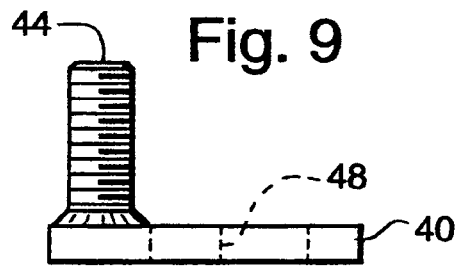
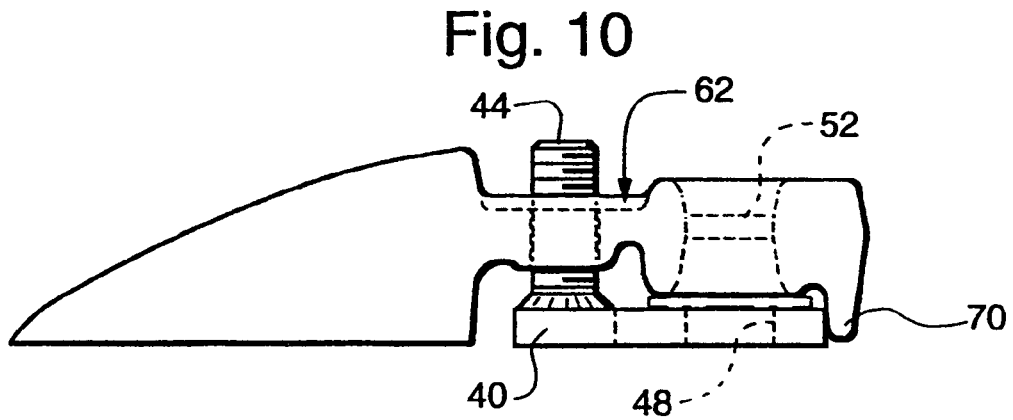

ADJUSTABLE HOLD-DOWN FOR SICKLE GUARDS

CROSS-REFERENCE TO RELATED APPLICATIONS

The invention is this application is related to those disclosed and claimed in U.S. application Ser. Nos. 10/319,291, 10/319,353 and 10/319,355 entitled,respectively, "Mechanism for Preventing Misalignment of Hold-Downs", "Sickle Cutterbar Assembly", and "Stud Plate for Sickle Bar Hold-Down". All of these applications were filed on the same date as the instant application, and all have the same inventors.

BACKGROUND OF THE INVENTION

The present invention relates generally to a mowing apparatus of the reciprocating sickle type and more particularly to a hold-down with improved adjustment characteristics.

The general mode of operation of reciprocating sickle bar mowing apparatus is well known, as is the importance of keeping the sickle bar knife sections substantially parallel to the ledger surface on the guards, and maintaining the proper clearance between them for good shearing action. Some form of hold-down clip or plate extending over the knife sections is generally used for this purpose.

Heretofore known hold-down mechanisms, such as those shown in U.S. Pat. Nos. 3,490,215, 3,577,716, 4,012,891, 4,894,979 and 6,305,154 are widely used, but have not been entirely satisfactory. The difficulty of adjusting such mechanisms often results in mowers being operated with improper knife clearance. Too much clearance allows crop material to force the knife section away from the cutting edges of the guards, greatly reducing cutting efficiency. Too small a clearance results in drag on the sickle bar assembly and a resultant increase in wear rate and power requirements. For the older clip-type hold-downs, adjustment is generally accomplished by bending the forward portion of the hold-down clip up or down as required, by using a hammer. This method is time consuming and inconvenient, and usually requires removal of the sickle bar so that the adjustment must be checked by means of a gauge rather than by direct measurement with the knives in place. Some attempts at improvement of this type of hold-down clip have involved pivoting the clip in a cradle mounted on the frame member and providing screw-type adjusting means so that the clearance between the forward part of the clip and the sickle section can be varied.

Both the conventional hold-down clip and the screw adjusted versions are typically placed between guards where they suffer additional dual disadvantages—first, of being located so as to snag crop material divided and deflected into this area by the guards, and second, of having only an indirect effect in controlling knife clearances in that they are not directly above the guard ledger surfaces.

Other attempts at improvement have included a variety of less conventional designs including some in which the hold-down plate itself is a form of leaf spring or is spring loaded so that there is always hold-down pressure on the knife sections although, typically, means are provided for adjusting this pressure. This type of hold-down clip is in constant contact with the knife sections and the drag between them increases wear rate and the power required to operate the mowing apparatus.

In another design, the hold-down clip is centered on the guard and clamped in position with the same screw fastener that retains the guard. Typically, screw adjustment is provided to raise or lower the forward part of the clip, but before the screw adjustment can be made, the screw fastener must be loosened to permit pivoting of the hold-down clip, consequently loosening the guards and upsetting adjustment of the wear plates between the sickle bar assembly and the frame member.

It would be quite advantageous to have an adjustment mechanism that does not require removal of components, hammering, or the loosening of hardware to accomplish appropriate adjustments.

SUMMARY OF THE INVENTION

Accordingly, it is an object of the present invention is to provide a sickle bar hold-down with a novel mechanism for adjusting the spatial relationship between the hold-down and the sickle knife sections.

Another object of the present invention is to provide a sickle bar hold-down that is more easily and reliably adjusted relative to the sickle knife sections than similar mechanisms heretofore known.

It is another object of the instant invention to provide a forged sickle bar hold-down that has an elongated finger-like body portion with a knife section facing surface and a reduced transverse cross-sectional area at a strategic location that allows selective flexing of the finger-like body portion adequate to adjust the spatial relationship between the knife section facing surface and the sickle knife sections.

Yet another object of the present invention is to provide a sickle bar hold-down that is infinitely adjustable independently of the mechanism by which the hold-down is affixed to a support structure.

It is yet another object of this invention to provide an improved sickle bar hold-down that is durable in construction, inexpensive to manufacture, carefree of maintenance, facile in assemblage, and simple and effective in use.

These and other objectives are attained by providing a forged sickle bar hold-down formed with a reduced transverse cross-sectional area and a first hole therethrough positioned toward the rear end of the hold-down. The hold-down includes a second hole therethrough positioned between the reduced cross-sectional area and the first hole. In use, an attachment bolt is positioned through the first hole and a support bar and rigidly affixed thereto. A threaded adjustment bolt is inserted through the second hole and the support bar to selectively draw down on that portion of the hold-down forward of the reduced transverse cross-sectional area and thereby flex the forward portion of the hold-down which includes an elongated finger-like body portion with a knife section facing area.

DESCRIPTION OF THE DRAWINGS

The advantages of this invention will be apparent upon consideration of the following detailed disclosure of the invention, especially when taken in conjunction with the accompanying drawings wherein:

FIG. 4 is a top view of one hold-down forging, alone;

FIG. 5 is a side elevation of the forging of FIG. 4;

FIG. 6 is a bottom plan view of the forging of FIGS. 4 and 5;

FIG. 7 is a top plan view of the stud plate element;

FIG. 8 is a front elevational view of the stud plate of FIG. 7;

FIG. 9 is an end, or side elevation of the stud plate of FIGS. 7 and 8; and

FIG. 10 is an end elevational view of the hold-down forging in place on the stud plate with a single optional shim interposed.

DESCRIPTION OF THE PREFERRED EMBODIMENT

Figure 1:
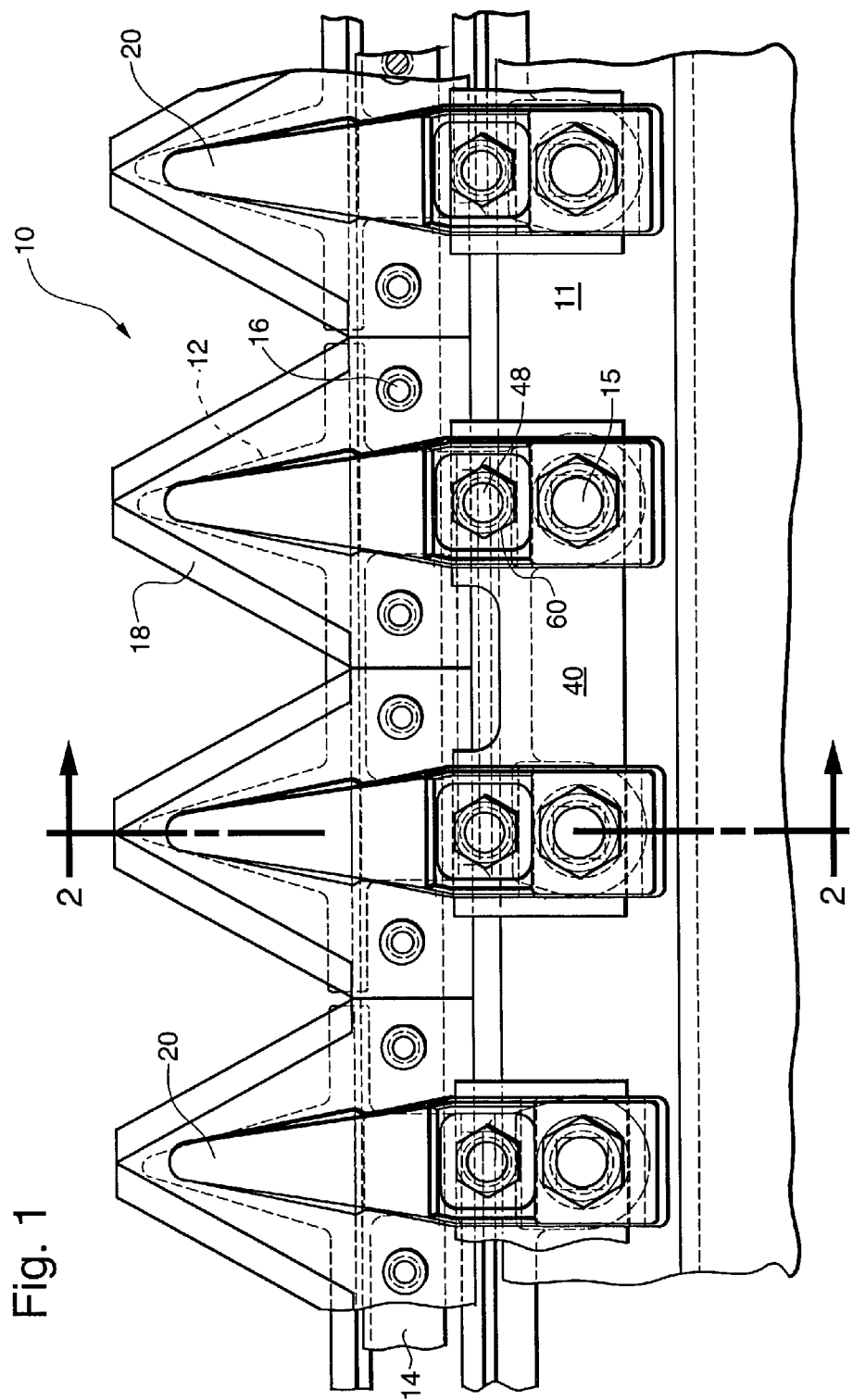
FIG. 1 is a top plan view of a fragmentary part of a cutterbar assembly showing a complete assembly of the elements of the instant invention.
Figure 2:
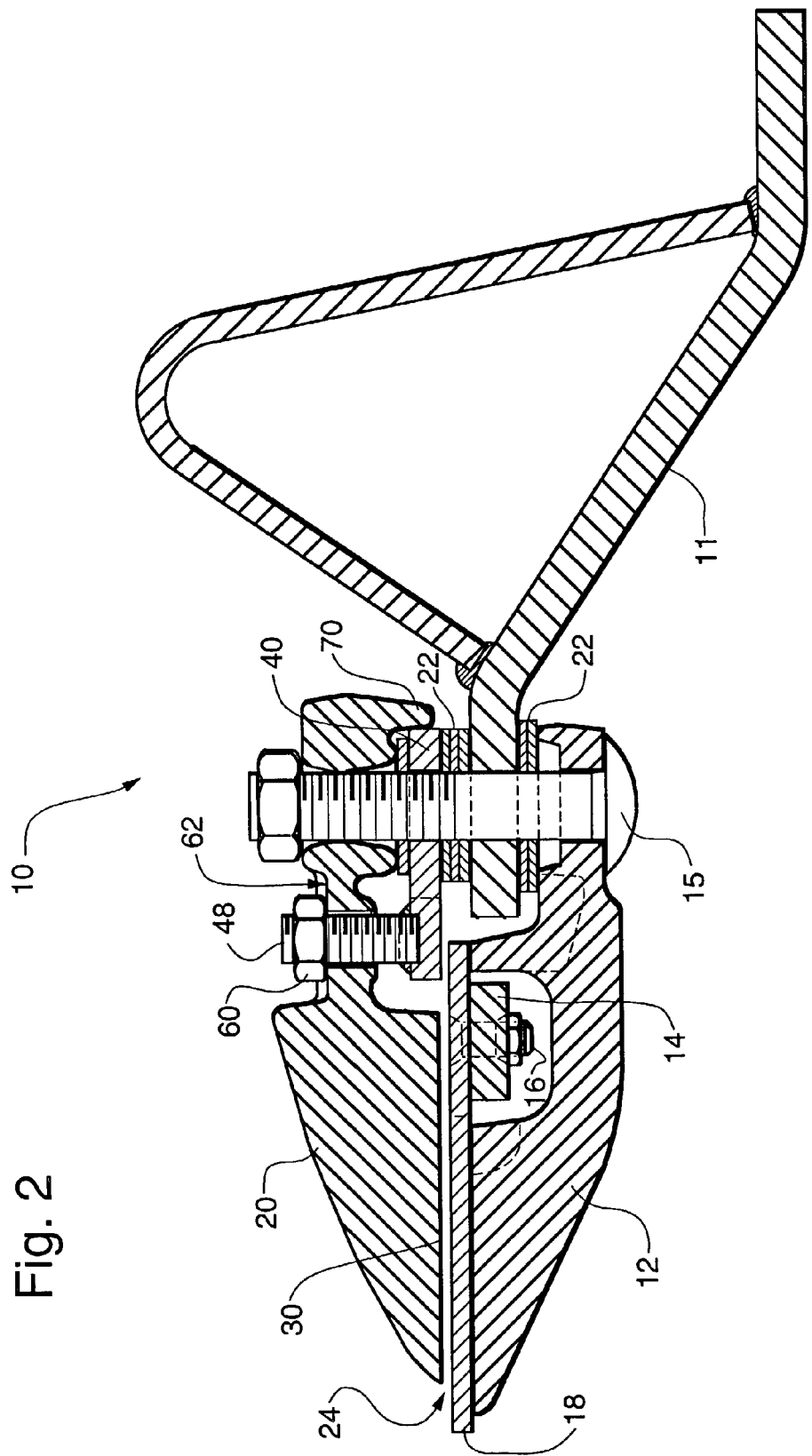
FIG. 2 is an enlarged vertical section taken along the line 2-2 of FIG. 1.

The harvester or other machine with which the hold-down of the present invention is utilized has a crop cutting mechanism, most commonly referred to as a reciprocating sickle-type "cutterbar" 10 that normally extends horizontally across the path of forward travel of the harvester. The cutterbar 10 is typically affixed to the forward lower portion of a frame structure or a fairly rigid metallic floor member 11 so as to present the cutterbar at the initial crop-engaging portion of the machine. A plurality of sickle guards 12, shown in phantom in FIG. 1, are positioned regularly across the bottom of the cutterbar. An elongate knife-back 14 also extends across the cutterbar and has removably affixed thereto by bolts 16, a plurality of knife sections 18. The knife sections 18 are reciprocated lengthwise (by means, not shown, at one or both ends depending upon whether it is a single or double sickle bar cutterhead) so that the cutting edges on the knives register with the generally matching edges of the guards 12 to create a scissoring action to sever the crop material. In order to ensure that the knife sections and guards maintain the proper relationship for cutting, a plurality, one above each sickle guard, of hold-downs 20 are attached. This "sandwich" of components, along with appropriate shims 22, is held together and attached to the member 11 by fastener means in the nature of carriage bolts 15.

In all such mechanisms, the relationship between the hold-down and the knife section is critical to efficient and effective operation, and the objective in performing such adjustment is to minimize the gap 24, yet allow adequate space for the free movement of the knife sections. The hold-down of the instant invention is intended to promote easy and effective adjustment of this relationship.

Figure 3:
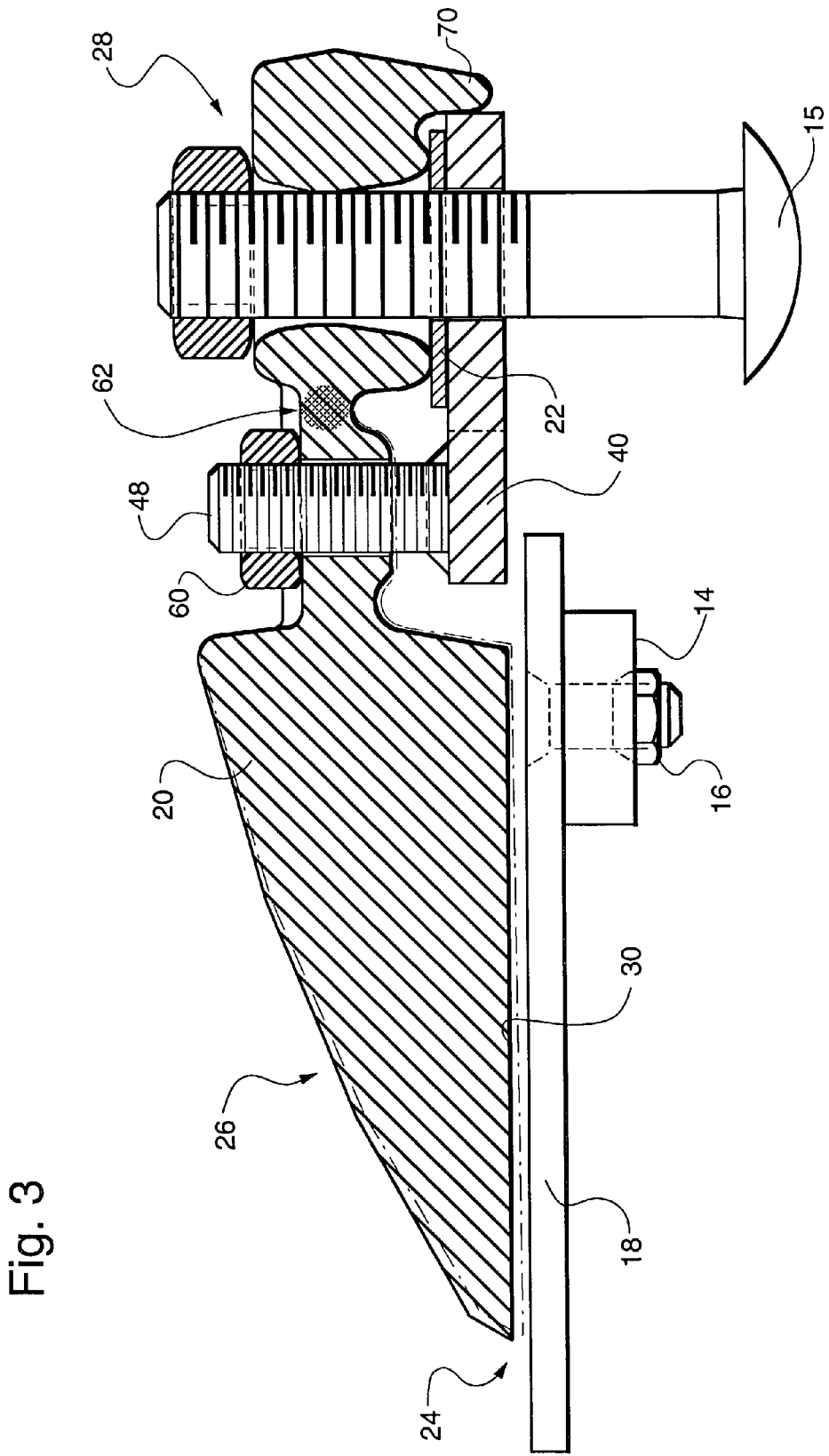
FIG. 3 is a further enlarged sectional view of parts shown in FIG. 2 to better illustrate the operation of key parts.

Referring initially and broadly to FIGS. 1 and 3, the hold-down 20 is an elongate forging with a forward (in relation to the direction of travel of the harvester) finger-like portion 26 and a rear generally rectangular box-like portion 28. Referring to FIG. 3, the overall objective is to adjust the position of the lower surface 30 of front portion 26 of hold-down 20 between the fixed-line location and the dotted-line location, i.e., adjust the size of gap 24.

As best seen in FIGS. 7-10 a generally rectangular stud plate 40, comprising a flat portion of suitably rigid material such as, for example, 10B-38 steel, hardened, and two spaced-apart stainless steel studs 42 and 44 (also hardened) stud-welded thereto and two holes 46 and 48 therethrough and adjacent to the studs. The stud plate is compressed by carriage bolt 15 into the "sandwich" of components making up the cutterbar 10. The material characteristics, particularly of the flat portion, are important because of the wear to which the components are subjected. In this case, the knife sections 18 reciprocate closely adjacent the bottom of the stud plate 40, subjecting the two components to significant abrasion due to materials such as dirt and crop that move between the two. The preferred stainless steel studs do not corrode or "stick"to the nuts, and thus promote ease of adjustment.

The stud plate 40 mounts two hold-downs to the cutterbar structure 10 as shown generally in FIG. 1. Two is a convenient number of hold-downs making up this grouping, though any reasonable number could be used. Two provides what has been found to be the most expedient number for assembly and repair operations. Sometimes, however, because of the length of the cutterbar or for other reasons, single hold-downs may be used on part of the cutterhead assembly. Each hold-down 20 has a pair of holes 50 and 52 vertically therethrough similar in size and spacing to the studs and holes 42, 46 and 44, 48 of stud plate 40 50 that, as shown clearly in FIG. 10 the holes 50 fit over studs 44 and the two holes 48, 52 are in alignment for the insertion of carriage bolts 15. The lower area of the rear portion 28 of each hold-down 20 has a horizontal slot-like variably formed area raised relative to the lower surface 30 of the forward portion of hold-down 20 into which the stud plate 40 is fitted. The opposing upper surface, opposite the area into which the stud plate is fitted, is lowered and variably formed to receive a nut 60 on stud 42.

In cross-section, as seen best in FIGS. 2, 3, 5, and 10, rear portion 28 of hold-down 20 includes a narrowed section 62 (specially cross-hatched for illustration purposes in FIG. 3). Narrowed section 62 is of such size and thickness as to permit a small amount of flexing of the forward portion 26 of the hold-down, in spite of the fact that the hold-down 20 is preferably a forging. With the cutterbar assembled as in FIG. 2, tightening of the nut 60 on stud 42 will cause flexure at section 62 and resultant pivoting of the forward portion 26 of hold-down 20 about that section, moving the lower surface 30 toward knife section 18.

This adjustment is simple to accomplish in that it merely requires the insertion of a feeler gauge into the gap and the manipulation of nut 60. There is no need to adjust or loosen other nuts and bolts, disassemble the cutterhead, or otherwise engage in complex multi-step mechanical manipulations.

The rearmost segment of the rear portion 28 includes a protruding ridge, or lip 70 extending across the rear end thereof. Lip 70 is generally perpendicular to the longitudinal axis of hold-down 20, i.e., the axis running from the point of finger-like front portion 26 through the middle of rectangular rear portion 28. Thus, in the assembled "sandwich", when lip 70 is in registry with the rear edge of stud plate 40, the front portion 26 of hold-down 20 is in proper position over the knife section 18. Lip 70 also prevents the "wiggling"of front portion 26 of hold-down 20, even if the hardware somehow becomes slightly loosened. The lip structure could be used on substantially any hold-down with or without the stud plate 40—so long as a similarly appropriate edge is provided on the underlying components.

Appropriate shims 22 should be inserted in the assembly to assure that the hold-down is initially installed in a horizontal position. It is from this horizontal position that adjustments are made to respective gaps 24 in the various assemblies.

The shape of the hold-downs shown herein are what may be referred to as a "big foot". Specifically, the "big foot" design can be identified in any of the cross-sectional views of the hold-down. Notice that there is only a very small cutout on the underside of the finger-like forward portion 26. The smaller this cutout, the less opportunity there is for crop materials to become entangled, forming what is sometimes referred to as a "mustache". These mustaches can become surprisingly long and even interfere with the cutting operation of adjacent knife sections and the flow of cut crop material to the processing components of the harvester. Other designs may be required by the hardware used to hold the knife sections and knife backs together. If the rivet heads or nuts protrude above the surface of the knife section, the hold-down will have to have a cutout of sufficient clearance to allow passage of the knife sections.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. In a sickle bar cutting mechanism, including a sickle bar assembly, affixed to and supported by the forward end, as determined by the operational direction of travel, of the frame of a crop mowing machine, said sickle bar assembly having a plurality of sickle guards attached to said forward end of said frame in side-by-side relationship generally horizontally along said forward end, each said sickle guard with at least one elongate portion extending forwardly and having a first generally planar upwardly facing surface; an elongate knife back; a plurality of knife sections each with angled forwardly converging cutting edges affixed to said knife back generally uniformly along the length thereof, each said cutting edge intersecting with a cutting edge on the adjacent knife section at a rear vertex said knife back adapted to reciprocate along the length of said plurality of sickle guards such that the rearward vertices of said knife sections register with said first surfaces to cut crop material; a plurality of elongate hold-downs, one of said hold-downs associated with each said portion and having a second generally planar downwardly facing surface, said first and second surfaces forming a slot between each sickle guard and respective hold-down in which said knife section reciprocate, the improvement comprising:

each said hold-down comprising an elongate one-piece body having a tapered front portion, and an opposing generally rectangular rear portion with a width, a top surface and an opposing bottom surface, said front portion including said second planar surface and corresponding to part of said bottom surface and adapted to align with a sickle guard and knife section, said rear portion further including a generally planar first rear surface generally perpendicular to the planes of said top and bottom surfaces;

each said second generally planar downwardly facing surface does not have protrusions of any kind extending therefrom;

at least one hole through said rear portion and rigidly affixed to and bearing on said forward end of said frame by a first nut and bolt;

said bottom surface of said rear portion of said elongate body positioned to intimately contact said sickle bar assembly and including a ridge across the said width of said rear portion and protruding perpendicularly away from said lower surface of said elongate body, said ridge having a rear surface corresponding to said first rear surface of said rear portion and a generally parallel registration surface closely spaced from said rear surface toward said tapered front portion, whereby said ridge registration surface may register with a portion of said sickle bar assembly and thus properly align and maintain the spatial relationship between the front portion of the hold-down and the sickle guard;

each hold-down further having a reduced transverse cross-sectional area adjacent and forwardly of said point at which said hold-down is rigidly affixed to and bearing on said frame and having a second generally vertical hole therethrough adjacent to and forward of said reduced transverse cross-sectional area;

a second bolt through said second hole, with a second nut thereon, said second nut tightened on said second bolt to the point that said hold-down is flexed about said reduced transverse cross-sectional area, thereby modifying the spacing between said second surface and said knife section, though not completely eliminating said spacing.

2. The improvement of claim 1, wherein:
    said second bolt interconnects said hold-down and said frame.

3. The improvement of claim 2, wherein:
    each said elongate member extends forwardly beyond said hold-down.

4. A method of adjusting an agricultural sickle bar cutting mechanism, including a sickle bar assembly, wherein the sickle bar cutting mechanism is affixed to and supported by the forward end, as determined by the operational direction of travel, of the frame of a crop mowing machine, said sickle bar assembly having a plurality of sickle guards attached to said forward end of said frame in side-by-side relationship generally horizontally along said forward end, each said sickle guard with at least one elongated portion extending forwardly and having a first generally planar upwardly facing surface; an elongate knife back; a plurality of knife sections each with angled forwardly converging cutting edges affixed to said knife back generally uniformly along the length thereof, each said cutting edge intersecting with a cutting edge on the adjacent knife section at a rear vertex, said knife back adapted to reciprocate along the length of said plurality of sickle guards such that the rearward vertices of said knife sections register with said first surfaces to cut crop material; a plurality of elongate hold-downs, one of said hold-downs associated with each said portion and having a second generally planar downwardly facing surface, said first and second surfaces forming a slot between each sickle guard and respective hold-down in which said knife sections reciprocate;

each said hold-down comprising an elongate one-piece body having a tapered front portion, and an opposing generally rectangular rear portion with a width, a top surface and an opposing bottom surface, said front portion including said second planar surface and corresponding to part of said bottom surface and adapted to align with a sickle guard and knife section, said rear portion further including a generally planar first rear surface generally perpendicular to the planes of said top and bottom surfaces;

each said second generally planar downwardly facing surface does not have protrusions of any kind extending therefrom;

at least one hole through said rear portion and rigidly affixed to and bearing on said forward end of said frame by a first nut and bolt;

said bottom surface of said rear portion of said elongate body positioned to intimately contact said sickle bar assembly and including a ridge across the said width of said rear portion and protruding perpendicularly away from said lower surface of said elongate body, said ridge having a rear surface corresponding to said first rear surface of said rear portion and a generally parallel registration surface closely spaced from said rear surface toward said tapered front portion, whereby said ridge registration surface may register with a portion of the said sickle bar assembly and thus properly align and maintain the spatial relationship between the front portion of the hold-down and the sickle guard;

each said hold-down further having a reduced transverse cross-sectional area adjacent and forwardly of said point at which said hold-down is rigidly affixed to and bearing on said frame and having a second generally vertical hold therethrough adjacent to and forward of said reduced transverse cross-sectional area;

a second bolt through said second hole, with a second nut thereof, said second nut tightened on said second bolt to the point that said hold-down is flexed about said reduced transverse cross-sectional area, modifying the spacing between said second surface and said knife section, though not completely eliminating said spacing, the method comprising the steps of:

(a) aligning said ridge registration surface with a portion of the sickle bar assembly;
(b) tightening or loosening said second bolt to flex said hold-down about said reduced transverse cross-sectional area to reduce or increase, respectively, the spacing between said second surface and said knife section; and
(c) always maintaining some space between said second surface and said knife section.

* * * * *